United States Patent [19]

Rekuc

[11] Patent Number: 5,426,817
[45] Date of Patent: Jun. 27, 1995

[54] CORNER ROLLER ASSEMBLY

[75] Inventor: Richard J. Rekuc, Pattenburg, N.J.

[73] Assignee: Sudhaus of America, Phillipsburg, N.J.

[21] Appl. No.: 246,404

[22] Filed: May 20, 1994

[51] Int. Cl.⁶ .............................................. B60B 33/00
[52] U.S. Cl. .................................................. 16/29; 16/30
[58] Field of Search .......................... 16/18 B, 29, 30; 280/767; 190/18 A; 248/129

[56] References Cited

U.S. PATENT DOCUMENTS 1,004,550 10/1911 Bertke ........................................ 16/30
4,974,284 12/1990 Campbell .................................. 16/29

*Primary Examiner*—Mark Rosenbaum
*Assistant Examiner*—Kenneth J. Hansen
*Attorney, Agent, or Firm*—Herbert Dubno

[57] ABSTRACT

A chest, footlocker, article of luggage or the like can be equipped with corner members having studs to provide feet for the article. The corner members can be retrofitted with roller members which have flanges in which the studs are received so that the article can be rolled where desired. The members have mating connections for coupling them together.

14 Claims, 4 Drawing Sheets

CORNER ROLLER ASSEMBLY

SPECIFICATION

1. Field of the Invention

My present invention relates to a corner roller assembly and, more particularly, to a corner and roller arrangement for any kind of receptacle, e.g. a chest, footlocker, trunk, article of luggage or the like.

2. Background of the Invention

It is common practice to provide footlockers, trunks, chests and the like with corner assemblies which can serve to protect the bottom corners of the receptacle and to form pedestals or feet upon which the unit can rest.

It is also a common practice to mount rollers, casters or the like on such units and to provide rollers on articles of luggage and the like which are intended to be not only movable along the ground but even portable.

In some cases it is desirable to be able to provide feet for an article or unit which can support the article on a floor, on the ground or on some other support surface, such as another article when the articles are stacked, without allowing a rolling action, i.e. with maximum stability and minimum mobility, but to allow such mobility when the article is tilted or when it is desirable to apply rollers or the like.

There are no specialized devices for this purpose of which I am aware, and, as a rule, the mounting of rollers, casters or the like on a chest, footlocker, trunk or article of luggage is generally a time-consuming and complex process if the unit is not equipped with the rollers upon fabrication.

3. Objects of the Invention

It is, therefore, the principal object of the present invention to provide a corner roller assembly that can be made available with or without a roller and can be retrofitted with a roller when and if desired.

More specifically, it is an object of the invention to provide better protection for the corners of a chest, footlocker, trunk or article of luggage, hereinafter more generally, a receptacle, which will allow retrofitting of a roller at each corner or at a selected number of corners.

Still another object of the invention is to provide a device for the purposes described which will allow the application of rollers without changing the procedure or orientation of the article upon which the rollers are mounted.

Still another object of the invention is to provide an improved chest, footlocker, an article of luggage or trunk which has improved versatility.

SUMMARY OF THE INVENTION

These objects and others which will become apparent hereinafter are attained, in accordance with the invention, in a corner roller assembly comprised of two principal members, namely a corner member adapted to fit over a lower corner of a receptacle, especially a trunk, footlocker, chest or article of luggage so as to protect this corner and form a foot upon which an article can rest, and a roller member which can be engaged with the corner member if and when desired, having a hole in a bottom flange accommodating the stud of the corner member which forms the foot and which is also equipped with a roller.

According to an important feature of the invention, the lower surface of the flange which receives the stud is tangent to the roller and this flange is of a thickness substantially equal to that of the stud so that, when the roller member is applied to, say, two lower corners of the receptacle, the original orientation of the receptacle at the time it rests upon the studs, is not changed since the flange thicknesses of the roller members are substantially equal to the stud heights. Furthermore, the assembly does not permit the unit to rest only on the rollers so that the mobility of the article is increased before the article is tilted.

When, however, movement of the article along the ground is desired, it can be lifted at an end opposite the end provided with the roller so that the article can ride on those rollers along the surface.

The corner members which are employed may have a pair of vertical flanges connected to a bottom flange, each of the vertical flanges being formed with formations which can selectively receive a mating formation of a respective roller member so that the lower member can be affixed to one or the other of the vertical flanges, respectively.

In this fashion, a single corner member construction can be provided on each bottom corner of the chest or footlocker with the roller members being applied when and if desired and on one side or another of the chest or footlocker.

Of course, when supplied from the factory, if the chest, footlocker or the like is not intended to have significant mobility, it may be equipped exclusively with the corner members forming the feet of the article. The roller members may be made available to the customer in a kit or from some other source or from the retailer or wholesaler of the article, to allow the consumer and user to mount rollers as desired upon the corner members of the article.

More particularly the corner roller assembly for a receptacle, according to the invention, can comprise:
  a corner member adapted to be affixed to a receptacle and having a pair of angularly adjoining vertical flanges adapted to lie along respective walls of the receptacle and a bottom flange adapted to underlie a bottom of the receptacle, the bottom flange having a downwardly projecting stud capable of supporting the receptacle upon a surface, at least one of the vertical flanges being provided with an attaching formation; and
  a roller member fitted onto the corner member and comprising a support body provided with a respective attaching formation mating with the attaching formation of the corner member, a respective flange underlying the bottom flange and formed with a hole receiving the stud, and a roller journaled on the body.

As noted, the flange of the roller member can have a thickness at least equal to a height of the stud and preferably precisely equal to the height of the stud.

One of the formations can be provided with at least one tooth engageable in at least one indentation formed in the other formation to lock the members together. The body of the roller member may be formed in one piece with a bar and web slidable in a channel forming the mating formation of the corner member, the web engaging in a slot in a wall of the channel.

BRIEF DESCRIPTION OF THE DRAWING

The above and other objects, features and advantages of the invention will become more readily apparent from the following description, reference being made to the accompanying highly diagrammatic drawing in which.

SPECIFIC DESCRIPTION

Figure 1:
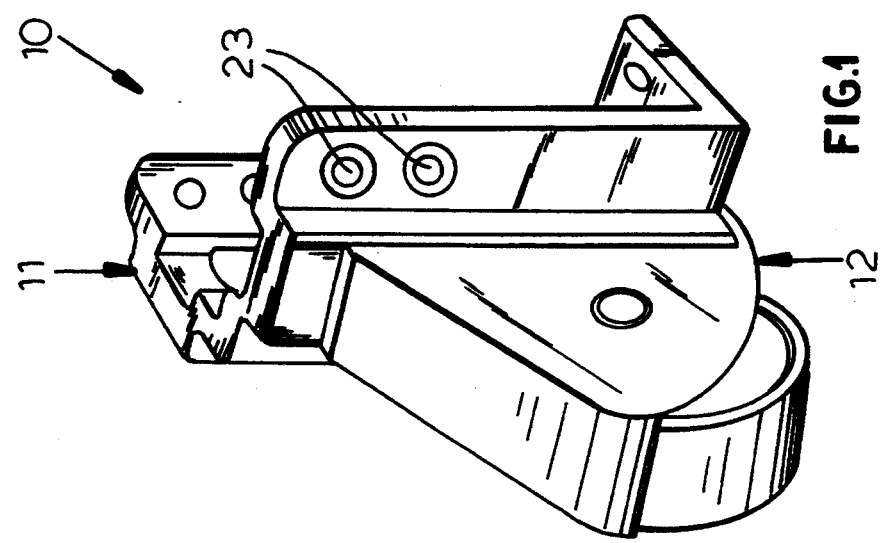
FIG. 1 is an assembled view of the corner roller assembly of the present invention without the chest footlocker or the like to which the assembly is intended to be attached.
Figure 2:
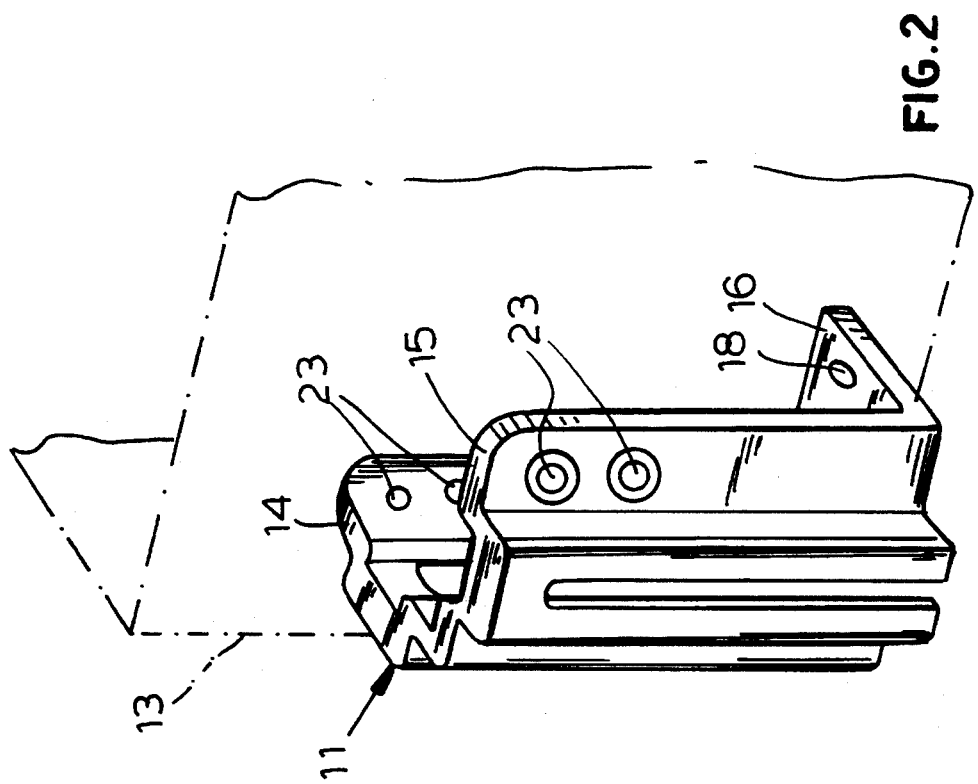
FIG. 2 is a perspective view of a corner member fitted to one corner of a chest, footlocker or article of luggage according to the invention.
Figure 4:
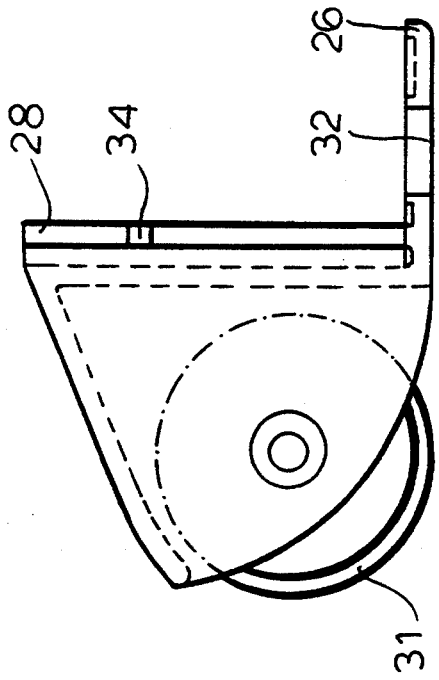
FIG. 4 is a side view of the roller member.

As can be seen from FIG. 1, the corner roller assembly 10 of the invention comprises a corner member 11 and a roller member 12 which can be fitted as a unit on a lower corner of a chest, footlocker or the like 13 (FIG. 2). Alternatively, and as shown in FIG. 2, the corner member 11 may be fitted on a lower corner of the chest, footlocker or other receptacle at the factory, and the roller member 12 may be applied subsequently.

The corner member 11 can basically comprise a pair of vertical flanges 14 and 15 which can lie along vertical walls of the chest or footlocker, and a bottom flange 16 which can lie along the bottom of the receptacle, these flanges being molded from a synthetic resin material and especially a high-impact plastic, in one piece.

The bottom flange 16 is provided (see FIGS. 7–10), with a downwardly extending stud 17 and with a hole 18 for receiving a rivet or screw enabling attachment of the corner member to the bottom of the article.

Similarly, each of the vertical flanges 14, 15 can be provided with a respective channel 19, 20, a base of which is formed with a vertical slot 21, 22. The flanges 14 and 15 are also provided with holes 23, for example, accommodating screws for attaching the corner member to the walls of the chest or other article.

Figure 8:
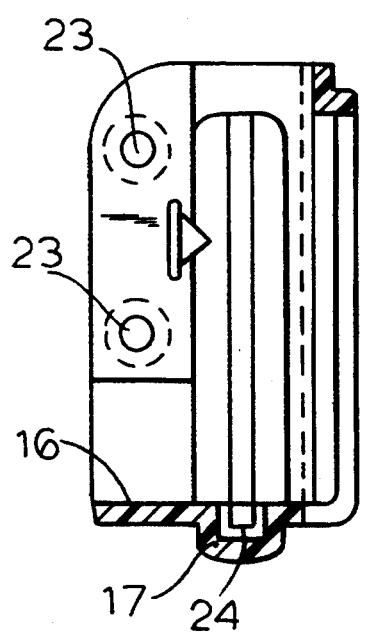
FIG. 8 is a vertical cross section through the corner member.
Figure 10:
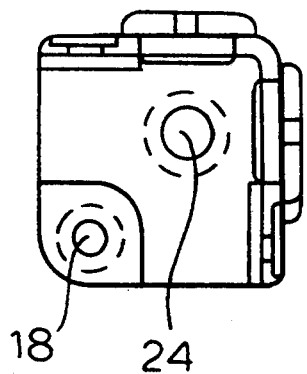
FIG. 10 is a top view of the corner member.

The stud 17 may be hollow and can have a blind bore 24 visible in FIGS. 8 and 10.

To mate with the channel of one or the other vertical flange, the body 25 of the roller member 12 is molded unitarily with a flange 26 formed with a hole 27 dimensioned to snugly accommodate the stud 17.

The thickness T of the flange 26 is equal to or only slightly greater than the height H of the stud 17 for purposes to be described in greater detail below.

The body 25 is formed unitarily with an upstanding flat bar 28 forming the head of a T cross section formation connected by a web 29 to a roller housing 30 in which a roller 31 can be accommodated.

The plane of the lower surface 32 of flange 26 is tangent to the outer periphery of the roller 31.

The bar 28 can be accommodated in one or the other of the channels of the corner members.

Figure 6:
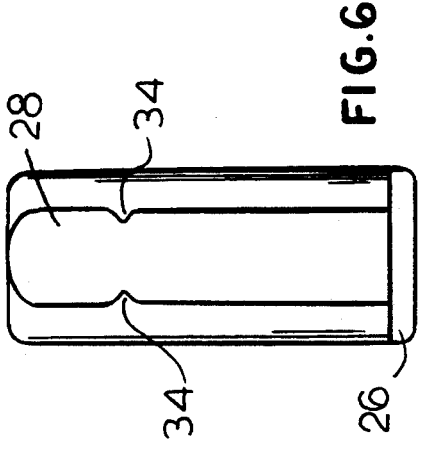
FIG. 6 is an end view of this body, showing the bar forming the mating formation thereof.
Figure 5:
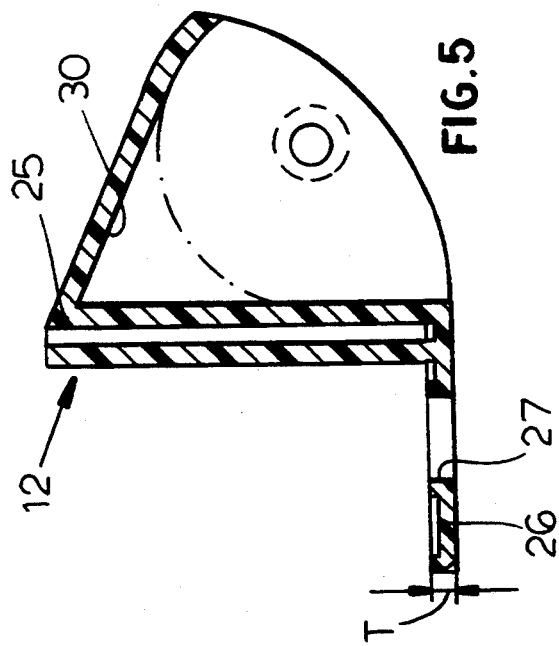
FIG. 5 is a cross sectional view taken along the line V—V of FIG. 3.
Figure 3:
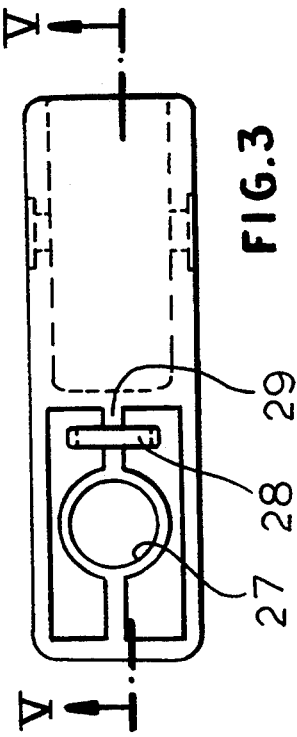
FIG. 3 is a top view of the body of the roller member shown without the roller.
Figure 9:
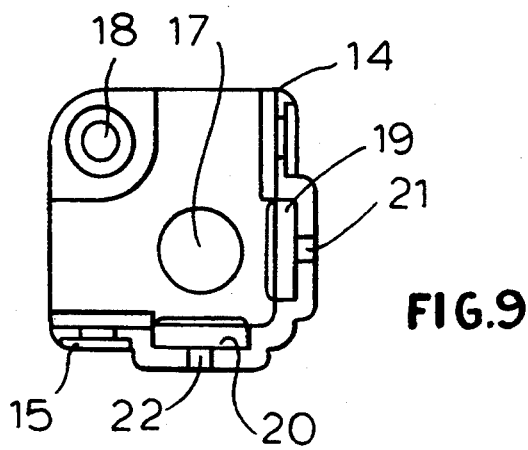
FIG. 9 is a bottom view of the corner member.

As will be apparent from FIGS. 11 and 12, when the assembly is to be equipped with rollers, the roller members are inserted from below into the selected channels, the bar is pressed upwardly until a tooth 33 of the channel engages in an indentation 34 of the respective bar. As can be seen from FIG. 6, such indentations can be provided along both lateral edges of the bar 28. When the bar is in a respective channel 20, the respective web 29 engages in the corresponding slot 22. The roller member is pressed upwardly until the stud 17 engages in the respective hole 27.

Since the underside of the flange 26 can rest on the surface P which is the surface upon which the studs stand, the article is not tilted by the application of the roller member. However, when the article is then swung in the direction of arrow A (FIG. 12), the article is supported by the roller 31 and can be drawn along the ground.

The roller members can be supplied to the consumer independently of the article for retrofitting to the corners 11 as may be desired.

Figure 7:
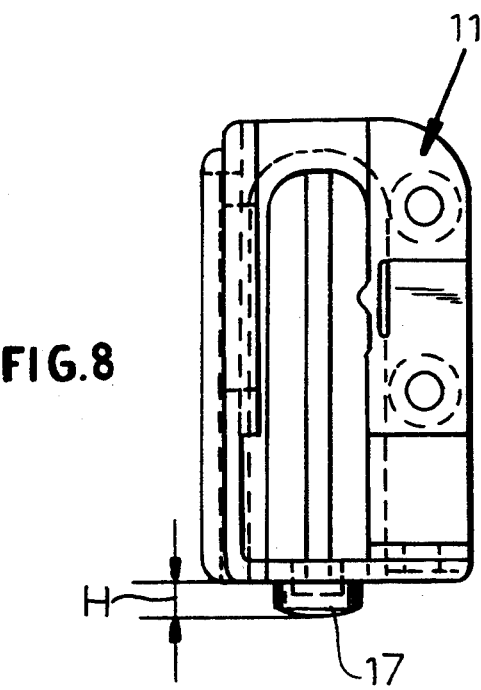
FIG. 7 is a side elevational view of the corner member.
Figure 12:
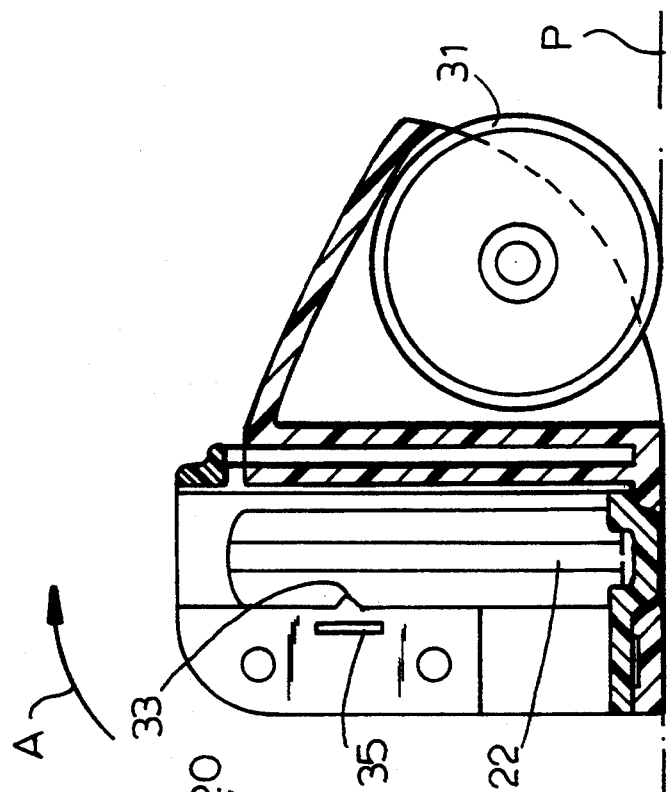
FIGS. 11 and 12 are sectional views through the assembly with the roller member mounted on one and the other of the vertical flanges of the corner member, respectively.
Figure 11:
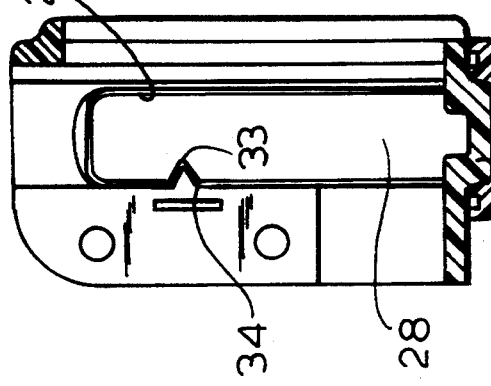
Figure 13:
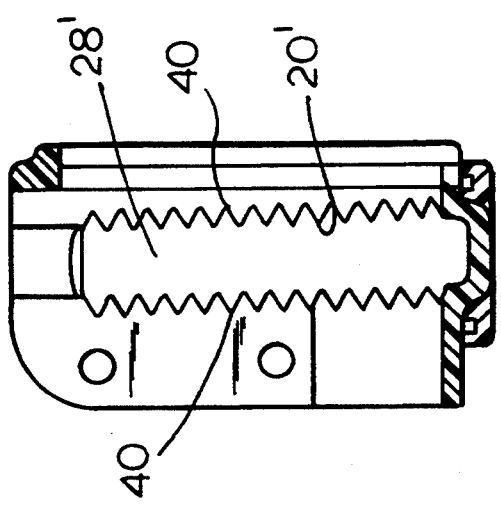
FIG. 13 is a view similar to FIG. 11 showing a ratchet arrangement for securing the roller member to the corner member.

As can be seen especially from FIGS. 11 and 12 but also from FIGS. 7 and 8, inwardly of each tooth 33, an opening 35 can be provided to impart yieldability to the tooth. The tooth and indentation arrangement locks the roller member to the corner member. Another form of locking can be effected by a saw-tooth ratchet arrangement as shown in FIG. 13 at 40. In that case, the edges of the bar 28' and the sides of the channel 20' can be equipped with oppositely directed teeth to secure the roller member to the corner member.

It is claimed:

1. A corner roller assembly for a receptacle, comprising:
   a corner member adapted to be affixed to a receptacle and having a pair of angularly adjoining vertical flanges adapted to lie along respective walls of the receptacle and a bottom flange adapted to underlie a bottom of the receptacle, said bottom flange having a downwardly projecting stud capable of supporting said receptacle upon a surface, at least one of said vertical flanges being provided with an attaching formation; and
   a roller member adapted to be selectively fitted onto said corner member and comprising a support body provided with a respective attaching formation mating with the attaching formation of said corner member, a respective flange underlying said bottom flange and formed with a hole receiving said stud, and a roller journaled on said body.

2. The assembly defined in claim 1 wherein said flange of said roller member has a thickness of a maximum of the height of said stud.

3. The assembly defined in claim 1 wherein one of said formations is provided with at least one tooth engageable in at least one indentation formed in the other of said formations to lock said members together.

4. The assembly defined in claim 1 wherein a respective said attaching formation of said corner member is formed on each of said vertical flanges, said roller member being mounted selectively on one of said vertical flanges.

5. The assembly defined in claim 1 wherein said body is molded in one piece with the respective formation, with a housing for said roller, and with said flange of said roller member.

6. The assembly defined in claim 1 wherein said attaching formation of said corner member is a channel defined by a wall having a vertical slot and said attaching formation of said roller member is a bar receivable in said channel and a web connected to said bar, said web being slidable in said slot.

7. The assembly defined in claim 1 wherein said corner member is molded in one piece of a synthetic resin material.

8. The assembly defined in claim 1 wherein said flanges of said corner member are provided with holes enabling securing of said corner member to said receptacle.

9. The assembly defined in claim 1 wherein at least one of said vertical flanges is provided with a respective vertically extending channel opening downwardly and defined by a wall formed with a vertical slot, said attaching formation of said roller member having a T-shaped cross section and including a flat vertical bar receivable from below in a respective one of said channels, and a web adapted to slide upwardly in said slot, said roller member having a molded body with said flange of said roller member, a housing for said roller, said web and said bar unitary therewith.

10. The assembly defined in claim 9 wherein each of said channels is formed with a tooth, said bar having an indentation for receiving one of said teeth to lock said members together.

11. The assembly defined in claim 10, further comprising an opening in a wall of each channel behind the respective tooth to impart yieldability to the respective tooth.

12. The assembly defined in claim 10 wherein said bar and each of said channels are formed with matable teeth constituting a ratchet and locking said members together.

13. The assembly defined in claim 10 wherein each of said flanges of said corner member is provided with at least one hole for receiving a fastener securing the corner member to the receptacle.

14. The assembly defined in claim 13 wherein said corner member is molded in one piece.

* * * * *